(12) United States Patent
Chang et al.

(10) Patent No.: US 12,388,487 B2
(45) Date of Patent: Aug. 12, 2025

(54) REFLECTION CANCELLATION FOR SINGLE-ENDED SIGNALING

(71) Applicant: Apple Inc., Cupertino, CA (US)

(72) Inventors: Yu Chang, Los Altos, CA (US); Mitesh D. Katakwar, Santa Clara, CA (US); Huabo Chen, Saratoga, CA (US); Huy M. Nguyen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/516,182

(22) Filed: Nov. 21, 2023

(65) Prior Publication Data

US 2025/0105870 A1 Mar. 27, 2025

Related U.S. Application Data

(60) Provisional application No. 63/585,050, filed on Sep. 25, 2023.

(51) Int. Cl.
*H04B 1/525* (2015.01)
*H04L 25/03* (2006.01)

(52) U.S. Cl.
CPC ....... *H04B 1/525* (2013.01); *H04L 25/03343* (2013.01); *H04L 25/03885* (2013.01)

(58) Field of Classification Search
CPC .............. H04B 2215/00; H04B 1/0475; H04L 25/03006
See application file for complete search history.

(56) References Cited

U.S. PATENT DOCUMENTS

| | | | |
|---|---|---|---|
| 7,969,256 B2 * | 6/2011 | Otsuka | H04L 25/028 |
| | | | 333/202 |
| 8,395,234 B2 | 3/2013 | Okushima et al. | |
| 8,786,048 B2 | 7/2014 | Okushima et al. | |
| 8,798,204 B2 | 8/2014 | Chen et al. | |
| 8,896,352 B2 * | 11/2014 | Huang | H03H 11/44 |
| | | | 327/108 |
| 9,130,535 B2 * | 9/2015 | Lin | H03F 3/193 |
| 9,401,706 B2 | 7/2016 | Tirunagari et al. | |
| 9,602,314 B1 | 3/2017 | Chang | |
| 9,621,136 B1 | 4/2017 | Chang | |
| 9,806,915 B1 | 10/2017 | Elzeftawi et al. | |
| 9,934,176 B2 | 4/2018 | Wang et al. | |
| 10,530,615 B1 | 1/2020 | Hur et al. | |

(Continued)

*Primary Examiner* — Freshteh N Aghdam
(74) *Attorney, Agent, or Firm* — Kowert, Hood, Munyon, Rankin & Goetzel, P.C.; Dean M. Munyon

(57) ABSTRACT

Circuits for reflection cancellation in single-ended signaling are disclosed. A transmission circuit includes a control circuit configured to receive a plurality of input signals that include a plurality of symbols having at least one bit and a data driver circuit configured to generate a particular signal on a transmission medium using a particular symbol of the plurality of symbols. The transmission circuit further includes a reflection cancellation circuit configured to, after a generation of the particular signal, generate a reflection cancellation signal on the transmission medium using an inverted value of a different symbol of the plurality of symbols received prior to the particular symbol. A first composite of the particular signal and the cancellation signal is readable at a load as a value of the particular symbol, wherein the load is configured to receive a transmitted signal via the transmission medium.

20 Claims, 10 Drawing Sheets

(56) References Cited

U.S. PATENT DOCUMENTS

| | | |
|---|---|---|
| 10,727,895 B1 | 7/2020 | Nguyen et al. |
| 2008/0123771 A1 | 5/2008 | Cranford et al. |
| 2009/0252212 A1* | 10/2009 | Risk .................. H04L 25/03343 |
| | | 375/230 |
| 2012/0121004 A1* | 5/2012 | Chang ...................... H03H 7/40 |
| | | 375/232 |
| 2019/0123551 A1 | 4/2019 | Yuan et al. |
| 2022/0103149 A1 | 3/2022 | Duan et al. |

* cited by examiner

REFLECTION CANCELLATION FOR SINGLE-ENDED SIGNALING

PRIORITY CLAIM

The present application claims priority to U.S. Provisional App. No. 63/585,050 entitled "Reflection Cancellation for Single-Ended Signaling," filed Sep. 25, 2023, the disclosure of which is incorporated by reference herein in its entirety.

BACKGROUND

Technical Field

This disclosure is directed to electronic circuits, and more particularly, circuits for maintain the integrity of signals transmitted over a communications channel.

Description of the Related Art

Signaling in communications between electronic circuits may in some cases utilize differential signaling, while single-ended signaling may be used in others. Differential signaling is used in many systems to utilize common mode noise rejection, which helps to maintain signal integrity. However, due to pin counts, differential signaling is not always practical. For example, certain communications in an electronic system may utilize parallel transmission to avoid having to convert data between serial and parallel formats. Since a single transmission medium utilizes two different wires in a differential signaling system, pin counts would be double relative to a system in which single-ended signaling is used for the parallel transmission. Nevertheless, using single-ended signaling results in the use of different techniques in order to ensure the integrity of signals transmitted between a source and a destination.

SUMMARY

Circuits for reflection cancellation in single-ended signaling are disclosed. In one embodiment, a transmission circuit includes a control circuit configured to receive a plurality of input signals having a plurality of symbols comprising at least one bit, and a data driver circuit configured to generate a particular signal on a transmission medium using a particular symbol of the plurality of symbols. The transmission circuit further includes a reflection cancellation circuit configured to, after generation of the particular signal, generate a reflection cancellation signal on the transmission medium using an inverted value of a different symbol of the plurality of symbols received prior to the particular symbol. A first composite of the particular signal and the cancellation signal is readable at a load as a value of the particular symbol, wherein the load is configured to receive a transmitted signal via the transmission medium.

In various embodiments, an echo cancellation circuit is also provided. The echo cancellation circuit is configured to, after the generation of the particular signal, generate an echo cancellation signal on the transmission medium using the particular symbol, wherein a second composite of the particular signal, the reflection cancellation signal, and the echo cancellation signal is readable at the load.

In one embodiment that is an example of a use case, the circuits disclosed herein may be implemented in a memory subsystem. The memory subsystem includes a plurality of memory circuits coupled to a data bus that includes a plurality of wires and a memory controller coupled to the data bus. The memory controller is configured to receive one or more signals that encode a plurality of symbols that include at least one bit, and generate a plurality of signals on corresponding ones of the plurality of wires using corresponding ones of the plurality of symbols. In response to a determination that a particular time period has elapsed after a generation of the plurality of signals, the memory controller may generate a plurality of reflection cancellation signals on the corresponding ones of the plurality of wires using respective inverted values of different symbols received prior to the plurality of symbols, wherein respective composites of the first plurality of signals and the plurality of reflection cancellation signals are readable at the plurality of memory circuits as respective values of the at least one bit included in a particular symbol.

BRIEF DESCRIPTION OF THE DRAWINGS

The following detailed description makes reference to the accompanying drawings, which are now briefly described.

DETAILED DESCRIPTION OF EMBODIMENTS

Figure 1:
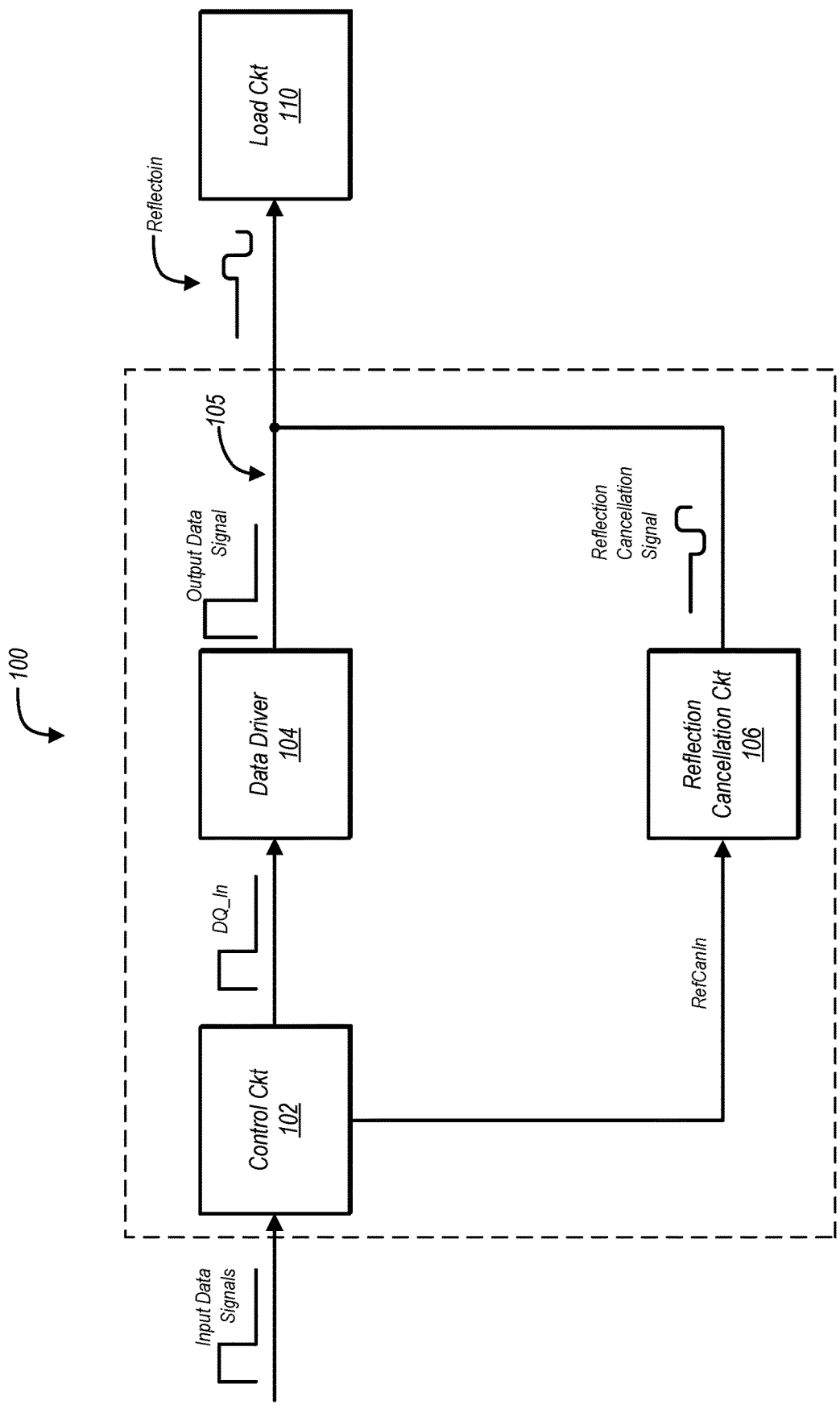
FIG. 1 is a block diagram of one embodiment of a transmitter circuit.

In transmitting a signal between two different points in electronic systems, there are various challenges that must be dealt with to ensure the signal's integrity. Reflections and echoes can reduce the voltage and timing margins that define an eye-opening, thereby increasing the difficulty in correctly interpreting the data inherent in a signal. The reflections and echoes may be a result of, e.g., inter-symbol interference (ISI) in which previously transmitted symbols interfere with currently transmitted symbols. As defined herein, a symbol may be a value having one or more bits. ISI refers to the distortion of a signal that occurs when a transmitted symbol interferes with neighboring symbols (e.g., a previous symbol interferes with a currently transmitted symbol). For example, a signal representative of a symbol comprising a single bit may introduce distortion on a signal line that affects the signal carrying the next bit to be transmitted.

Loading can also introduce ISI on a signal line. For example, in a dual-rank memory system, a long channel may exist between the memory and the memory controller for each bit transmitted there between. Furthermore, since data is transmitted to one rank in the dual-rank memory, there may be loading effects from the other rank. This latter problem can be exacerbated by different channel lengths for the different ranks, as well as by operation at higher clock frequencies. To combat these problems, an equalization circuit may be added to, e.g., perform pre-emphasis of signals transmitted from a memory controller to the memory. However, this may not be sufficient in all cases.

More generally, due to various electrical characteristics of a communications channel, various types of distortion may be introduced thereon. ISI and other types of distortion can negatively impact the integrity of a signal as it travels down a transmission medium to a receiver. If the ISI and/or distortion is severe enough, the receiver may misinterpret the data contained within the signal, which can lead to erroneous operation.

One technique to overcome ISI and other distortions is to provide equalization to a transmitted signal. Equalization can include adjusting the amplitude, phase, or frequency of a transmitted signal to better preserve those characteristics that are essential to proper interpretation at the receiver. However, equalization alone may not always be sufficient for a given communications channel.

The present disclosure is directed to additional circuits to counter the problems discussed above. In one embodiment, a reflection cancellation circuit is added to counter long delay reflection cancellation. The reflection cancellation circuit drives a cancellation signal that may substantially cancel out a reflection that may be present on the signal line due to, e.g., a previously transmitted signal/symbol. The reflection cancellation signal may be transmitted at substantially equal amplitudes and at an opposite polarity of the reflection, which results in its cancellation.

The present disclosure adds extra equalization and cancellation circuitry on the transmit path. In addition to performing pre-emphasis of transmitted signals, the transmitter circuitry of the present application adds circuitry that performs short delay echo cancellation along with the long delay reflection cancellation discussed above. The short delay echo cancellation provides a small boost to the signal to cancel out discontinuities in the rising and falling edges. The long delay echo reflection cancellation drives a cancellation signal into the line that cancels out the reflection. The outputs of these circuits are AC coupled to a common node and fed to a tap in a T-coil circuit before being driven to the transmission medium (e.g., a wire). While the scheme may be generally applied, it may be particularly useful in dual-rank memory subsystems where the lengths of the signal paths to the different ranks may be unequal, and where loading by one rank may occur when driving signals to the other rank. In the event that the characteristics of the signal path do not require the echo/reflection cancellation, the circuit can be re-purposed to provide additional pre-emphasis.

Additional details of circuits with short and long delay echo cancellation are discussed below. Various circuit embodiments are described, followed by a graphic illustration of signals and the echo cancellation that may be performed thereon. A use case in the form of a dual-rank memory system is then described. A discussion of various methods for operating echo cancellation circuits follows, including the performance of a training mode. The description closes with discussion of an example system that may implement the circuits of the present disclosure.

Circuits for Echo Cancellation:

Turning now to FIG. 1, a block diagram of one embodiment of a transmitter circuit is shown. In the embodiment shown, transmitter circuit 100 includes a control circuit 102 coupled to receive input data signals and convey corresponding signals (DQ_In as labeled here) to a data driver circuit 104 configured to drive output data signals onto a transmission medium 105. The output data signals may be transmitted over transmission medium 105 to a load circuit 110, which includes a receiver circuit configured to receive the data signals. Additional processing of the data signals may also be performed in the load circuit 110, or further downstream. The input data signals may be symbols comprising a single bit (e.g., a logic 0 or a logic 1), although the disclosure contemplates that the transmission of multi-bit symbols may be carried out in some embodiments.

Transmission medium 105 in the embodiment shown is a single-ended signal path. For example, transmission medium 105 may be a signal line coupled between a memory controller and a memory, and may be physically arranged near other signal lines. Since transmission medium 105 is a single-ended signal path, it may be more susceptible to various types of interference than differential signal paths, since it relies on measuring a voltage value at the receiver instead of a voltage differential, and has no common mode rejection of noise. Some of the problems with single-ended signaling may be exacerbated on the load end of the communications link, particularly in the termination of the signal paths. For example, the load circuit 110 in one embodiment may be a dual-rank memory system, with transmission medium 110 breaking into two different signal paths near the load. These paths may have different termination, and may not match the impedance of the main portion of transmission medium 110. In some embodiments, the path may also be unterminated or terminated with a different value. Embodiments are further possible an contemplated wherein the termination may vary with frequency of operation or on the role of the operation (e.g., targeted or non-targeted).

During signal transmissions, reflections may occur on transmission medium 105 due to the various issues discussed above. These reflections may travel back down transmission medium toward transmitter 100, and may cause inter-symbol interference (ISI) with subsequently transmitted signals. This ISI can adversely affect the integrity of the transmitted data symbols, and this may include causing an incorrect interpretation of the data at the receiver. Accordingly, transmitter 100 in the embodiment shown includes a reflection cancellation circuit 106. At some time subsequent to transmission of a data signal, reflection cancellation circuit 106 may transmit a reflection cancellation signal that is substantially equal in magnitude to the reflection, while also being opposite in polarity. Thus, as the name suggests, the meeting of the reflection cancellation signal and the reflection itself on transmission medium may result in cancellation of the latter.

Determining the timing and amplitude of the reflection cancellation signal may be carried out during operation in a training mode. Transmitter circuit 100 may enter a training mode during a system startup routine, periodically thereafter, or at other designated times (e.g., during change of a performance state). During operation in the training mode, transmitter circuit 100 may transmit one or more signals on transmission medium 105, and using measurement circuitry (not shown here), measure the amplitude, polarity, and timing of the reflections. Based on the amplitude, polarity, and timing of the reflections, the reflection cancellation circuit 106 may generate reflection cancellation signals that can be transmitted at the designated time to cancel reflections during normal operation.

Figure 2:
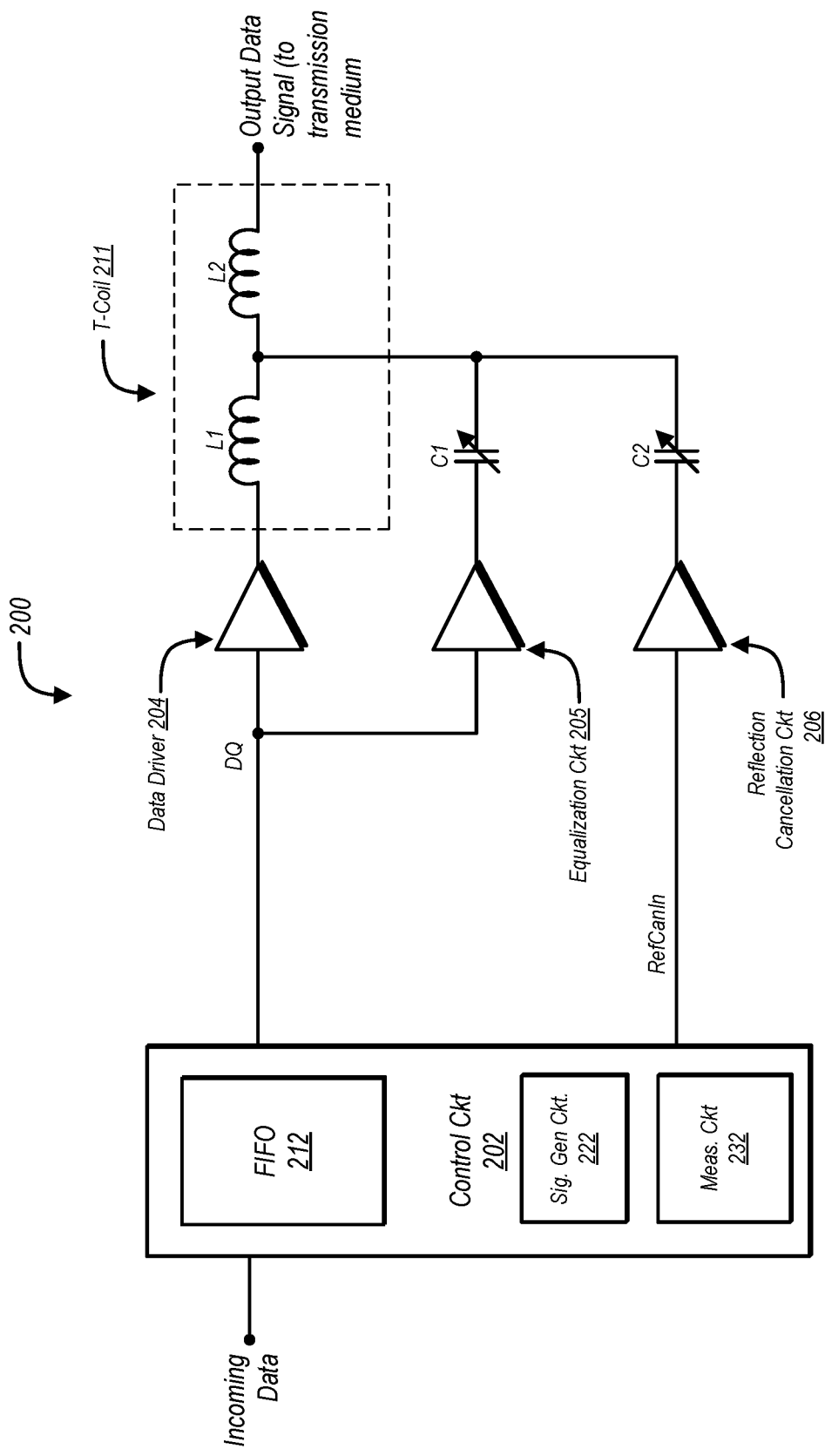
FIG. 2 is a block diagram of another embodiment of a transmitter circuit.

FIG. 2 is a diagram of another embodiment of a transmitter circuit. In the embodiment shown, transmitter circuit 200 includes a control circuit 202, which in turn includes a first-in, first-out buffer (FIFO) 212, a signal generation circuit 222, and a measurement circuit 232. The transmitter circuit 100 also includes a data driver circuit 204, an equalization circuit 205, and a reflection cancellation circuit 206. The output of data driver circuit 204 is coupled to a T-coil circuit 211, which includes inductors L1 and L2. Equalization circuit 205 is AC coupled, via capacitor C1, to a tap point of T-coil circuit 211 between inductors L1 and L2. Similarly, reflection cancellation circuit 206 is AC coupled to the same tap point, via capacitor C2. It is noted that other tap points may be used, and thus the example shown here is not intended to be limiting. Furthermore, embodiments are possible and contemplated in which the reflection cancellation circuit 206 and equalization circuit 205 are AC coupled to T-coil circuit 211 at different tap points with respect to one another. It is also noted that, while capacitors C1 and C2 are shown here as variable capacitors (e.g., to allow tuning of the circuit), embodiments having fixed capacitors are also possible and contemplated. The use of T-coil circuit 211 in this and other embodiments may speed up the rise time of transmitted signals.

Although not explicitly shown here, a receiver circuit may be implemented in conjunction with transmitter circuit 200 (as well as other transmitter embodiments discussed herein). Such a receiver circuit may be coupled to T-coil circuit 211 in a manner similar to data driver circuit 204, with the transmission medium on the other side of the T-coil being a bidirectional communications channel.

Incoming data to be transmitted may be temporarily buffered in FIFO 212, and conveyed in the received order as the signal DQ. Data driver circuit 204 may provide drive strength to the signal as it is transmitted into T-coil circuit 211. The signal DQ is also transmitted to equalization circuit 205 in this embodiment. When activated, equalization circuit 211 may modify the transmitted signal in terms of amplitude, phase, frequency response, or other parameter. When used, equalization provided by equalization circuit 205 may mitigate at least some factors that can cause distortion of signals transmitted onto a transmission medium coupled to the output of transmitted circuit 200. For example, equalization circuit 205 may provide extra amplitude to a transmitted signal to compensate for a loss of signal strength as the signal travels down the transmission medium to another receiver. As such, this may allow the receiver to correctly interpret the data. Equalization circuit 205 may transmit equalization signals concurrent with the transmission of data signals by data driver circuit 204.

Although not explicitly shown here, the control circuit 202 may provide one or more control signals to both data driver circuit 204 and equalization circuit 205. These signals may adjust transmission parameters of signals to be transmitted. In the case of equalization circuit 205, a control signal may be provided to selectively enable or disable the circuit. For example, during a transition in two consecutively transmitted signals from a logic 0 to a logic 1, control circuit 202 may enable equalization circuit 205 to provide additional signal strength to the signal corresponding to the logic 1 when transmitted by data driver circuit 204. This additional signal strength may be provided with appropriate timing to provide, e.g., the necessary extra amplitude to the signal transmitted by data driver circuit 204. In a case where several consecutive logic 0's or 1's are transmitted by data driver circuit 204, equalization circuit 205 may be disabled for at least some of the signals following that which represented the logical transition.

Reflection cancellation circuit 206 may transmit reflection cancellation signals to mitigate or cancel reflections that occur due to transmitted data signals. The reflection cancellation signals may be generated by signal generation circuit 222. In generating reflection cancellation signals, signal generation circuit 222 may generate signals having an amplitude, polarity, and timing to substantially cancel reflections that occur on the transmission medium to which transmitter 200 is coupled. Any suitable circuitry that can generate the reflection cancellation signals in terms of timing, amplitude, and polarity may be used to implement signal generation circuit 222. The reflection cancellation signals are provided on the signal path labeled RefCanIn to reflection cancellation circuit 206 at the appropriate time to provide reflection cancellation for data signals recently transmitted by data driver circuit 204.

Control circuit 200 also includes a measurement circuit 232. Measurement circuit 232 may be coupled to the transmission medium at some point, and may, during a training routine, perform measurements on the transmission medium to determine reflections as well as other distortions and/or ISI. Based on these measurements, signal generation circuit 222 may generate the reflection cancellation signals that are to be transmitted by reflection cancellation circuit 206. Additionally, after generation of preliminary reflection cancellation signals, measurement circuit 232 may perform measurements to determine the effectiveness of a particular reflection cancellation signal, which can then be used by signal generation circuit 222 for refinements. In this manner, training may be conducted in an iterative process, beginning with initial measurements, initial signal generation and transmission, and subsequent measurements and refinements until a reflection cancellation signal that mitigates reflections by a desired amount is achieved. Measurement circuit 232 may be implemented using any suitable circuitry that can measure amplitude of signals over some amount of time. Both measurement circuit 232 and signal generation circuit 222 may include analog, digital, and/or mixed signal circuits, including analog-to-digital converters (ADCs), digital-to-analog converters (DACs), clock circuits (e.g., to synchronize sampling of signals), and so on. Control circuit 200 may also, in some embodiments, adjust the value of the variable capacitors used for AC coupling, e.g., for impedance matching purposes.

Figure 3:
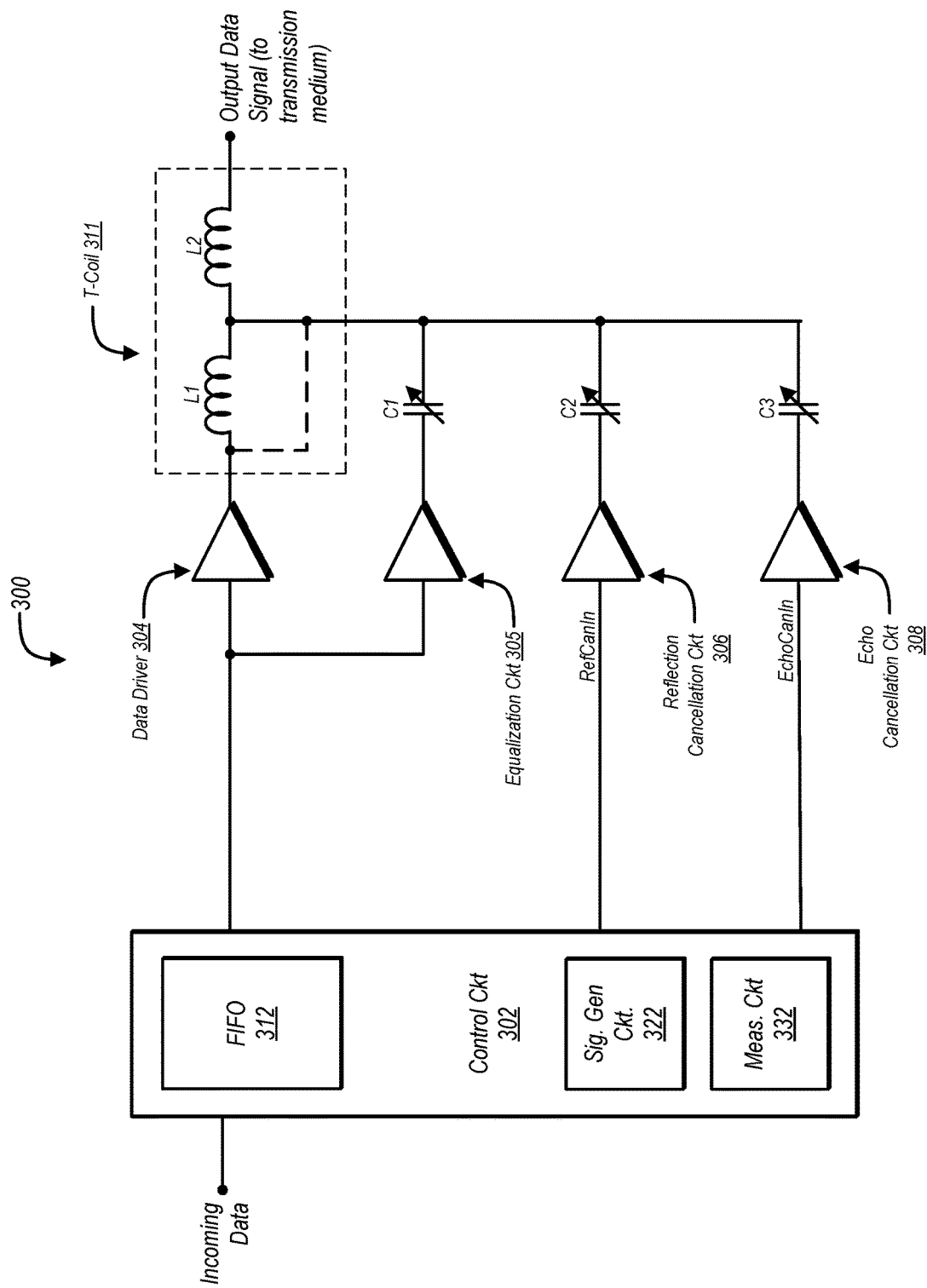
FIG. 3 is a block diagram of another embodiment of a transmitter circuit.

FIG. 3 is a diagram of another embodiment of a transmitter circuit. In the embodiment shown, transmitter circuit 300 includes a data driver circuit 304, an equalization circuit 305, a reflection cancellation circuit 306, an echo cancellation circuit 308, and a T-coil circuit 311 that may be coupled to a transmission medium. Data driver circuit 304, equalization circuit 305, and reflection cancellation circuit 306 may function in a manner similar to their counterparts described above in conjunction with FIG. 2.

Control circuit 302 in the embodiment shown includes FIFO 312, signal generation circuit 322, and measurement circuit 332. These circuits may functions similarly to those discussed previously with reference to FIG. 2, although the latter two may also carry out operations with respect to measuring an echo on a transmitted signal and carrying out generation of an echo cancellation signal, EchoCanIn.

Echo cancellation circuit 308 in the embodiment shown is configured to provide echo cancellation signals to T-coil circuit 311, via the AC coupling of capacitor C3. The echo cancellation signals may be transmitted concurrent with corresponding data signals to mitigate echoes of the data signal. These echoes may occur during the rise and fall times of the transmitted data signals. Additional details of the echoes to be canceled will be discussed below and are illustrated graphically in FIG. 5. Generation of the echo cancellation signal may be carried out by signal generation circuit 322. The parameters of the echo cancellation signal may be determined during a training routine using measurement circuit 332. The echo cancellation signal may be transmitted with a relatively short delay, nearly substantially concurrent with transmission of the data signal by data driver circuit 304. The transmission of the reflection cancellation signal, in contrast, is transmitted after a longer delay relative to the transmission of the data signal by data driver circuit 304.

While the embodiment shown here illustrates the AC coupling from the various circuits to T-coil circuit 311 at the junction of inductors L1 and L2, the disclosure is not intended to be limiting in this way. For example, as implied by the dashed line, one or more of these circuits may be AC coupled to T-coil circuit 311 at the junction between the output of data driver 304 and L1. Furthermore, it is noted that the various other circuits that are AC coupled to T-coil circuit 311 need not all be coupled to the same node. For example, one of the circuits may be AC coupled at the junction between the data driver 304 output and L1, while another one may coupled to the junction of L1 and L2. The particular coupling in a given circuit may be determine by which gives the desired or optimal channel response.

Figure 4:
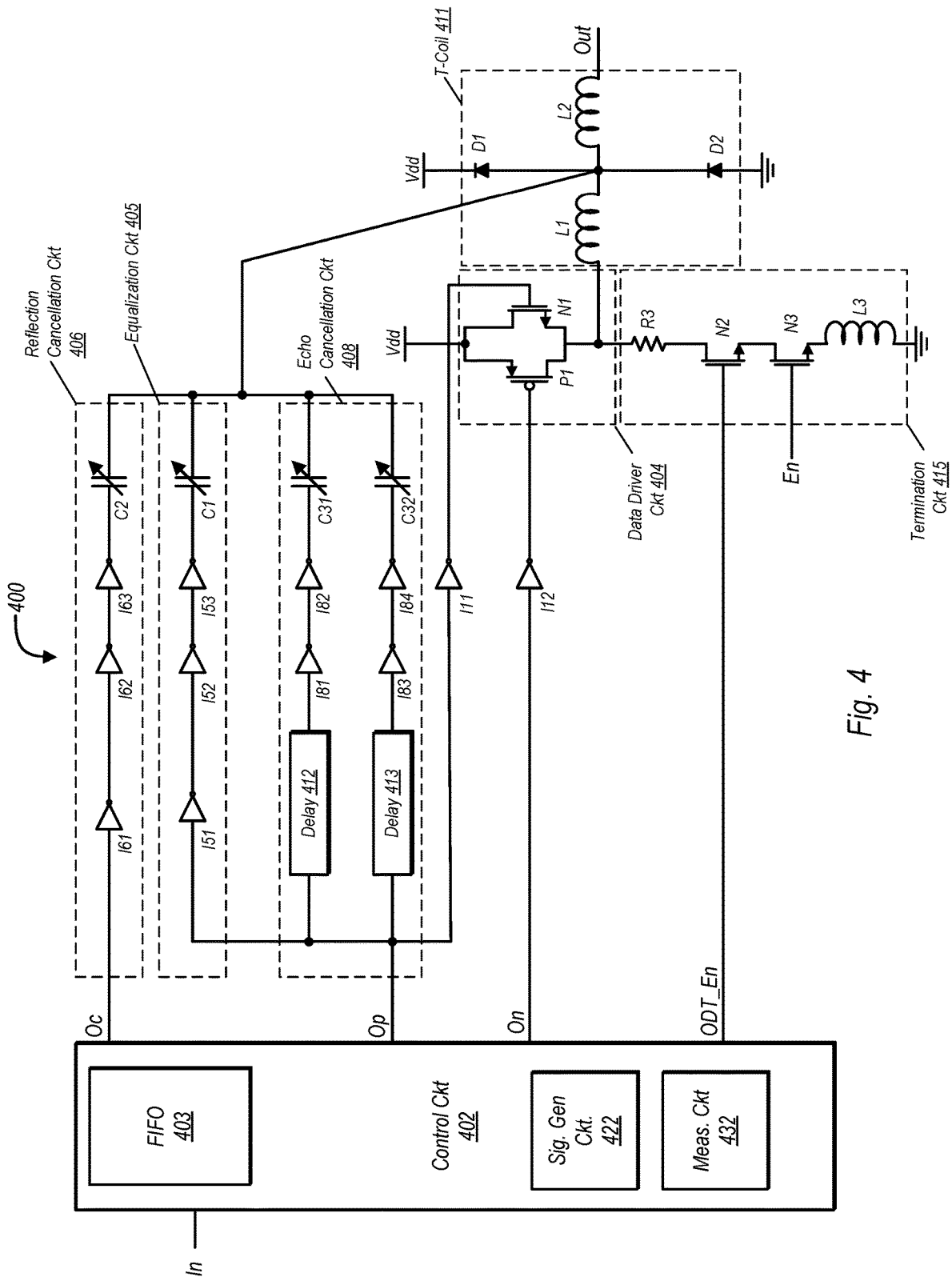
FIG. 4 is a schematic diagram of an embodiment of a transmitter circuit.

FIG. 4 is a schematic of one embodiment of a transmitter circuit according to the disclosure. In the embodiment shown, transmitter circuit 400 includes a control circuit 402, a data driver circuit 404, an equalization circuit 405, a reflection cancellation circuit 406, an echo cancellation circuit 408, a T-coil circuit 411, and a termination circuit 415. Control circuit 402 in the embodiment shown includes a FIFO 402, a signal generation circuit 422, and a measurement circuit 432.

Reflection cancellation circuit 406 in the embodiment shown is configured to transmit the echo cancellation signal onto a transmission medium via T-coil circuit 411. The reflection cancellation signal may be generated by signal generation circuit 422 based on a training routine, and may be transmitted at the desired delay to cancel reflections on the transmission medium. In this particular example, the delay is provided by inverters 161, 162, and 163, the latter of which is AC coupled via variable capacitor C2 to T-coil circuit 411. It is noted while inverters are shown as providing the delay, it is not intended to indicate that the delay has a fixed amount. On the contrary, the delay provided within reflection cancellation circuit 406 may be varied in accordance with information obtained during a training routine indicative of the delay between transmission of a data signal and its corresponding reflection being received.

Equalization circuit 405 in the embodiment shown includes inverters 151, 152, and 153, along with capacitor C1 to provide AC coupling to T-coil circuit 411. Although not explicitly shown here, equalization circuit 405 may include a pre-driver circuit used to provide additional drive strength to the data signal Op, when enabled. In various embodiments, equalization circuit 405 may be enabled during logical signal transitions, e.g., from a logic 0 to a logic 1. Equalization circuit 405 may be disabled during transmissions of strings of logic 0's or logic 1's if the additional drive strength is not needed. Additionally, in embodiment in which transmitter circuit 400 is implemented as part of a transceiver circuit coupled to a bi-directional medium, equalization circuit may be disabled during receive operations.

Echo cancellation circuit 408 in the embodiment shown includes two delay paths for providing delay to the transmitted data signal. In this embodiment, delay circuit 412 provides an appropriate delay for canceling an echo on a rising edge of the transmitted data signal, thereby generating a first portion of an echo cancellation signal. This signal is then conveyed through inverters 181 and 182 and capacitor C31. Delay circuit 413 provides delay for canceling an echo on the falling edge of the data signal, providing a second portion of the echo cancellation signal. This portion of the echo cancellation signal is conveyed through inverters 183, 184, and C32.

Data driver circuit 404 in the embodiment shown includes a PMOS device P1 and an NMOS device N1. The PMOS device is driven by a first portion of the data signal OP, while the NMOS device is driven by a second portion of the data signal ON. Data driver circuit 404 is coupled to termination circuit 415, which includes resistor R3, NMOS devices N2 and N3, and inductor L3, which provides inductive termination. When both N2 and N3 are active (in response to assertion of the signals ODT_En and En), data driver circuit 404 may act as a pull-up circuit (through P1 and N1) to transmit a logic 1, or a pulldown circuit (through termination circuit 415, with both P1 and N1 inactive) to transmit a logic 0. It is noted here that data driver circuit 404 and termination circuit 415 are shown here by way of example, but are not intended to be limiting. Other types of data driver and termination circuits are possible and contemplated.

T-coil circuit 411 in the embodiment shown includes serially-coupled inductors L1 and L2, with an example tap point between these two devices. The other (non-tap point) terminal of L2 is coupled to a transmission medium upon which the transmitted signals are conveyed. A clamping diode D1 is coupled between the junction of L1 and L2 and the voltage supply node Vdd. This diode may clamp the voltage on the junction to within a predetermined value by redirecting an excess voltage to the voltage supply node. Diode D2 functions as a flyback diode, providing a low resistance path for current when there is a sudden change of voltage on the junction of L1 and L2, thereby protecting the circuit from voltage spikes and transients (e.g., due to switching, electrostatic discharge, or other events). More generally, D1 and D2 may provide protection against various electrostatic discharge (ESD) events that may occur.

Figure 5:
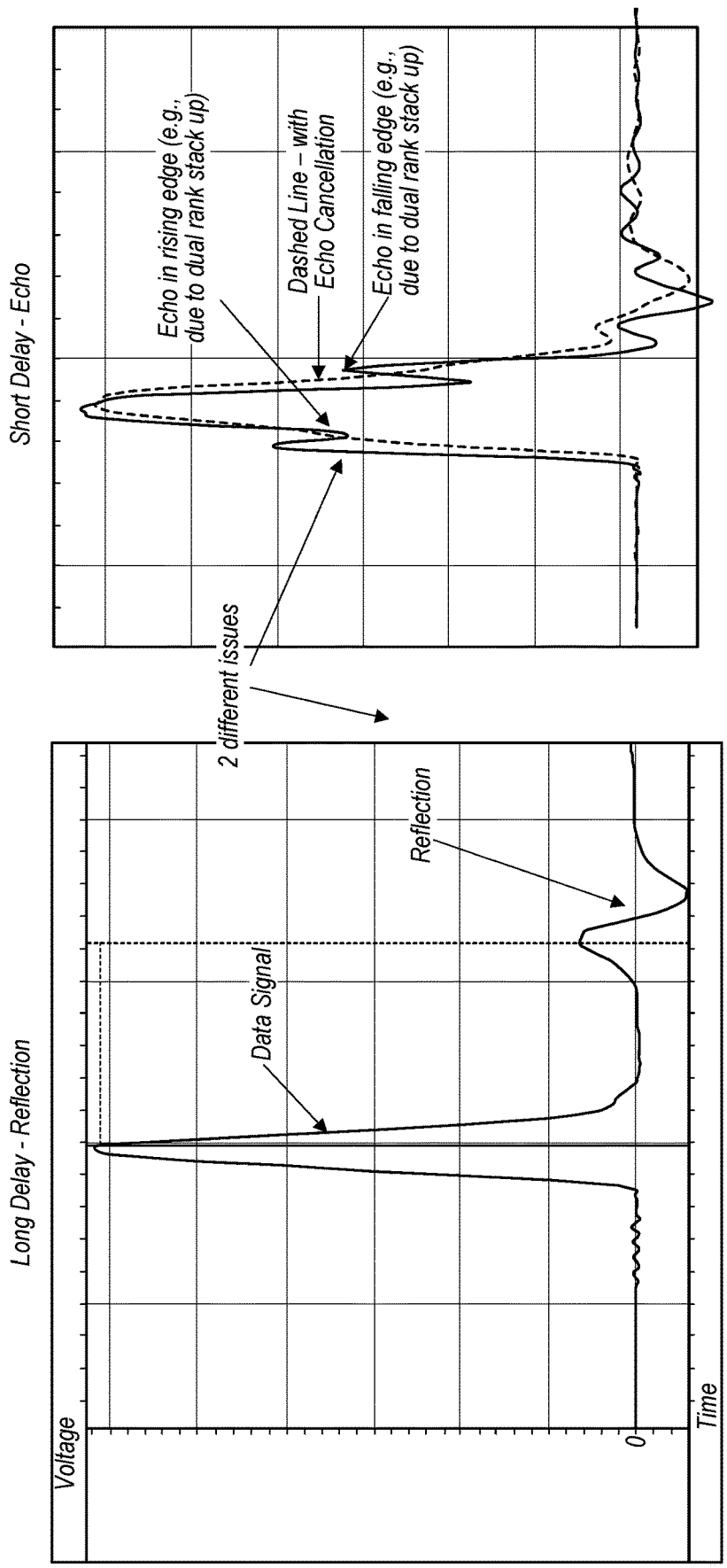
FIG. 5 is a graphic illustration of signal transmission and echoes/reflections encountered in one embodiment of a transmitter circuit.

Short and Long Delay Cancellation:

FIG. 5 is a graphic illustration of the reflection and echoes that may occur in conjunction with the transmission of signals in single-ended transmissions, thereby illustrating the reflection and echo cancellation functions. The cancellation of reflections is carried out by the long delay of a reflection cancellation circuit, such as those discussed above with reference to FIGS. 1-4. Similarly, the short delay circuits of the various echo cancellation circuit discussed above may cancel out echoes that would otherwise occur in transmitted signals.

The reflection, as shown in the left-hand portion of the drawing, occurs some time after transmission of the data signal. In this example, the reflection includes both positive-going and negative-going components. Cancellation of this reflection may be carried out by transmitting a reflection cancellation signal at the appropriate time, the reflection cancellation signal having substantially equal shape and magnitude with opposite polarity of the reflection itself. The reflection cancellation may be referred to as "long delay cancellation," as the delay between the transmission of the data signal and the associated reflection cancellation signal is longer relative to the transmission of the echo cancellation signals.

The right-hand portion of the drawing illustrates a signal transmitted without echo cancellation (solid line) and a signal transmitted with echo cancellation (dashed line). On the rising edge of the data signal, without echo cancellation, a discontinuity occurs where the signal momentarily falls in amplitude before rising again. Another discontinuity occurs on the falling edge of the data signal, wherein the signal momentarily begins rising in amplitude before falling again. These echoes may occur for various reasons, such as the dual-rank stack up of memory in embodiments where a transmitter of the present disclosure is implemented in a dual-rank memory subsystem (discussed in further detail below with referenced to FIG. 6).

With the transmission of echo cancellation signals, the discontinuities in the original data signal are substantially removed, with the rising and falling edges of the signals being relatively smooth. In various embodiments, such as that illustrated in FIG. 4, the transmission of the echo cancellation signal actually comprises transmission of two separate signals, one for the rising edge, and one for the falling edge. These signals may be referred to as short delay signals, as their delay relative to transmission of the data signal is shorter in comparison with the delay of the reflection cancellation signal.

Figure 6:
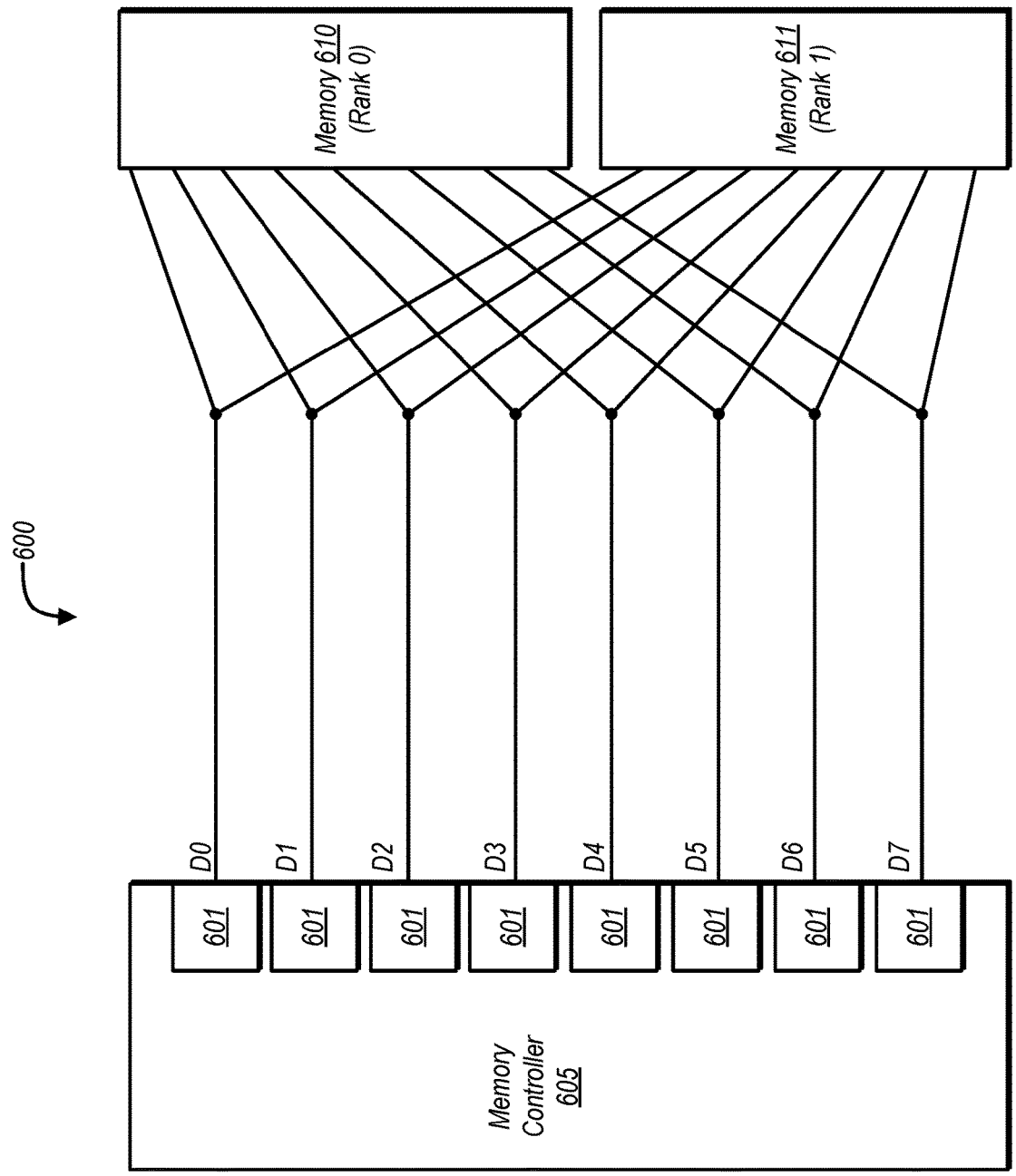
FIG. 6 is a block diagram of one embodiment of a dual-rank memory subsystem.

Memory Subsystem:

FIG. 6 is a block diagram illustrating one embodiment of a dual-rank memory subsystem. In the embodiment shown, memory subsystem 600 includes a memory controller 605, which includes a plurality of transmitter circuits 601, each corresponding to one of the data signal paths D0-D7. The transmitter circuits 601 may correspond to any of the various transmitter circuit embodiments discussed above, and may implement reflection cancellation along with the transmission of the signal. Equalization and echo cancellation may also be implemented by the various ones of transmitter circuits 601.

It is noted that for the sake of simplicity, other signal paths (to convey address and control signals) are not shown. It is further noted that the number of bits transmitted between a memory controller and a memory may vary from one embodiment to another, and that the eight-bit configuration is shown here by way of example. The various transmitter circuits shown here may further be part of transceiver circuits in embodiments in which the signal paths are bidirectional.

Memory subsystem 600 further includes two memories, memory 610 (Rank 0) and memory 611 (Rank 1). Both of these memories (which may be implemented as various types of DRAM) share the same set of data lines coupling them to memory controller 605. Due to this particular physical configuration, various issues discussed elsewhere herein, such as reflections on the signal lines may occur due to loading of one of the memories when transmitting signals to the other memory. Echoes may also occur. Accordingly, the transmitter circuits may implement the various cancellation circuits discussed above, and may further implement equalization as well. This may in turn improve the integrity of signals transmitted from the memory controller 605 to the memories 610 and 611.

The dual-rank memory subsystem 600 shown here represents one possible application of the various signal integrity techniques for single-ended signal transmission discussed above. However, this example is not intended to be limiting, as the various circuits and techniques used thereby may be applied to a wide variety of applications in which single-ended signaling is used.

Figure 7:
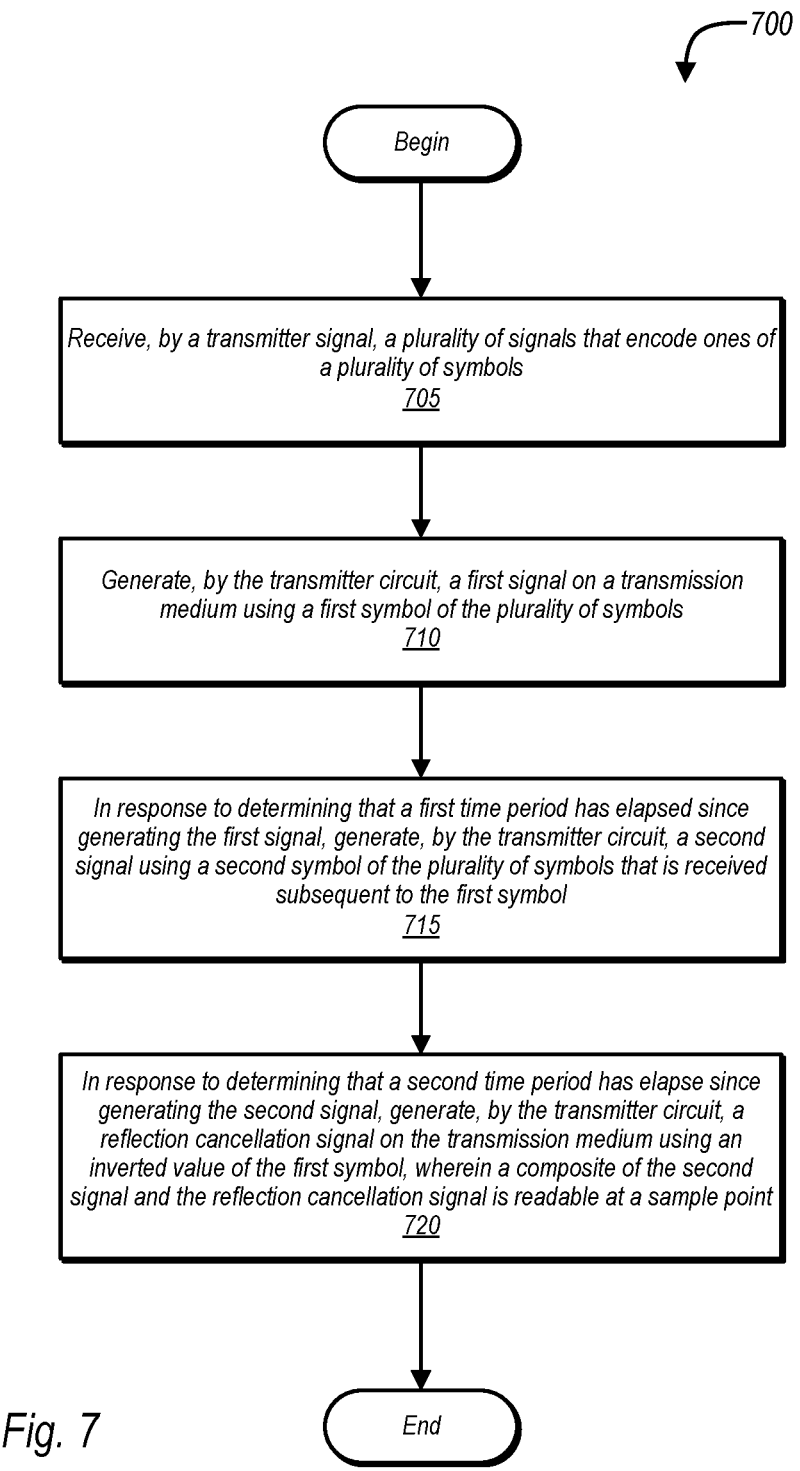
FIG. 7 is a flow diagram of one embodiment of a method for operating a transmitter circuit.

Methods of Operation:

FIG. 7 is a flow diagram of one embodiment of a method for operating a transmitter circuit. Method 700 as disclosed herein may be carried out by various ones of the circuit embodiments disclosed herein. Circuit embodiments capable of carrying out Method 700, but not explicitly disclosed herein, are also considered to fall within the scope of this disclosure.

Method 700 includes receiving, by a transmitter signal, a plurality of signals that encode ones of a plurality of symbols (block 705), and generating, by the transmitter circuit, a first signal on a transmission medium using a first symbol of the plurality of symbols (block 710). In response to determining that a first time period has elapsed since generating the first signal, the method further includes generating, by the transmitter circuit, a second signal using a second symbol of the plurality of symbols that is received subsequent to the first symbol (block 715). In response to determining that a second time period has elapse since generating the second signal, the method continues with generating, by the transmitter circuit, a reflection cancellation signal on the transmission medium using an inverted value of the first symbol, wherein a composite of the second signal and the reflection cancellation signal is readable at a sample point (block 720).

In some embodiments, the method includes generating, using an echo cancellation circuit, an echo cancellation signal on the transmission medium using the second symbol, wherein a composite of the first signal, the reflection cancellation signal, and the echo cancellation signal is readable at the sample point. Such embodiments may also include generating, by a driver circuit the transmitter circuit, the first signal on the transmission medium via a t-coil circuit. The method may also include generating, by a reflection cancellation circuit of the transmitter circuit, the second signal and conveying the second signal to the transmission medium via a tap point in the t-coil circuit, and conveying, using the echo cancellation circuit, the echo cancellation signal via the tap point in the t-coil circuit. Various embodiments of the method also include conveying the second signal and the echo cancellation signal to the t-coil circuit via AC coupling.

Various embodiments also contemplate activating, by a control circuit, a training mode. Activating the training mode includes causing the transmitter circuit, using the control circuit, to generate test signals on the transmission medium. Subsequent to generating the test signals, the method includes receiving test measurement data, by the control circuit, based on the transmission of the test signals. Using the measurement data, the method includes determining an updated value of the first time period. In some embodiments, the method contemplates activating the training mode during a cold boot procedure.

Figure 8A:
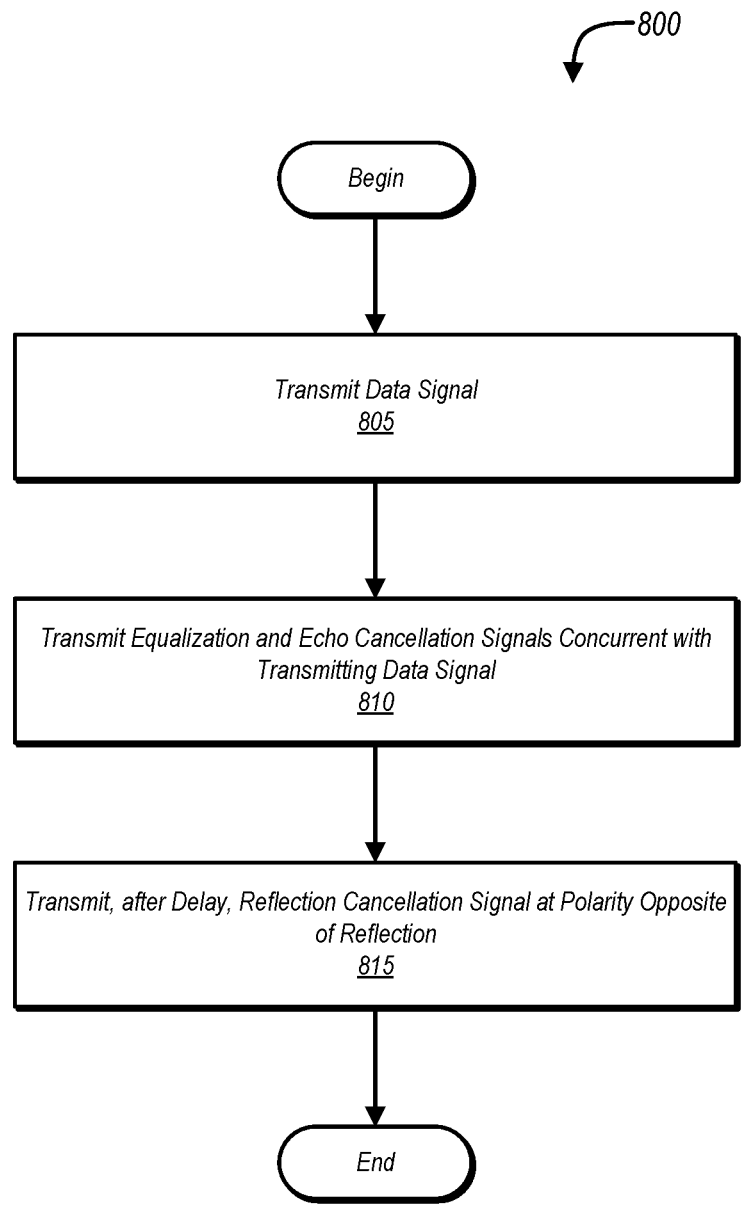
FIG. 8A is a flow diagram of another embodiment of a method for operating a transmitter circuit.

FIG. 8A is another embodiment of a method for operating a transmitter circuit. Method 800 may be carried out by any of the embodiments of a transmitter circuit as disclosed herein, as well as others not explicitly discussed but otherwise falling within the scope of this disclosure.

Method 800 includes transmitting a data signal (block 805). The data signal may include one or more bits, and may be transmitted from, e.g., a single-ended transmitter circuit. The method further includes transmitting equalization and echo cancellation signals concurrent with transmitting the data signal (block 810). The equalization signal may adjust the drive strength of the data signal, while the echo cancellation signal may compensate for echoes during the rise and fall times of the data signal. After a delay, the method further includes transmitting a reflection cancellation signal at a polarity opposite of a reflection (block 815). The reflection, its amplitude, and the timing thereof may be determined by a training procedure (to be discussed below). The amplitude of the reflection cancellation signal may be equal in magnitude to the reflection (in addition to being of opposite polarity).

Figure 8B:
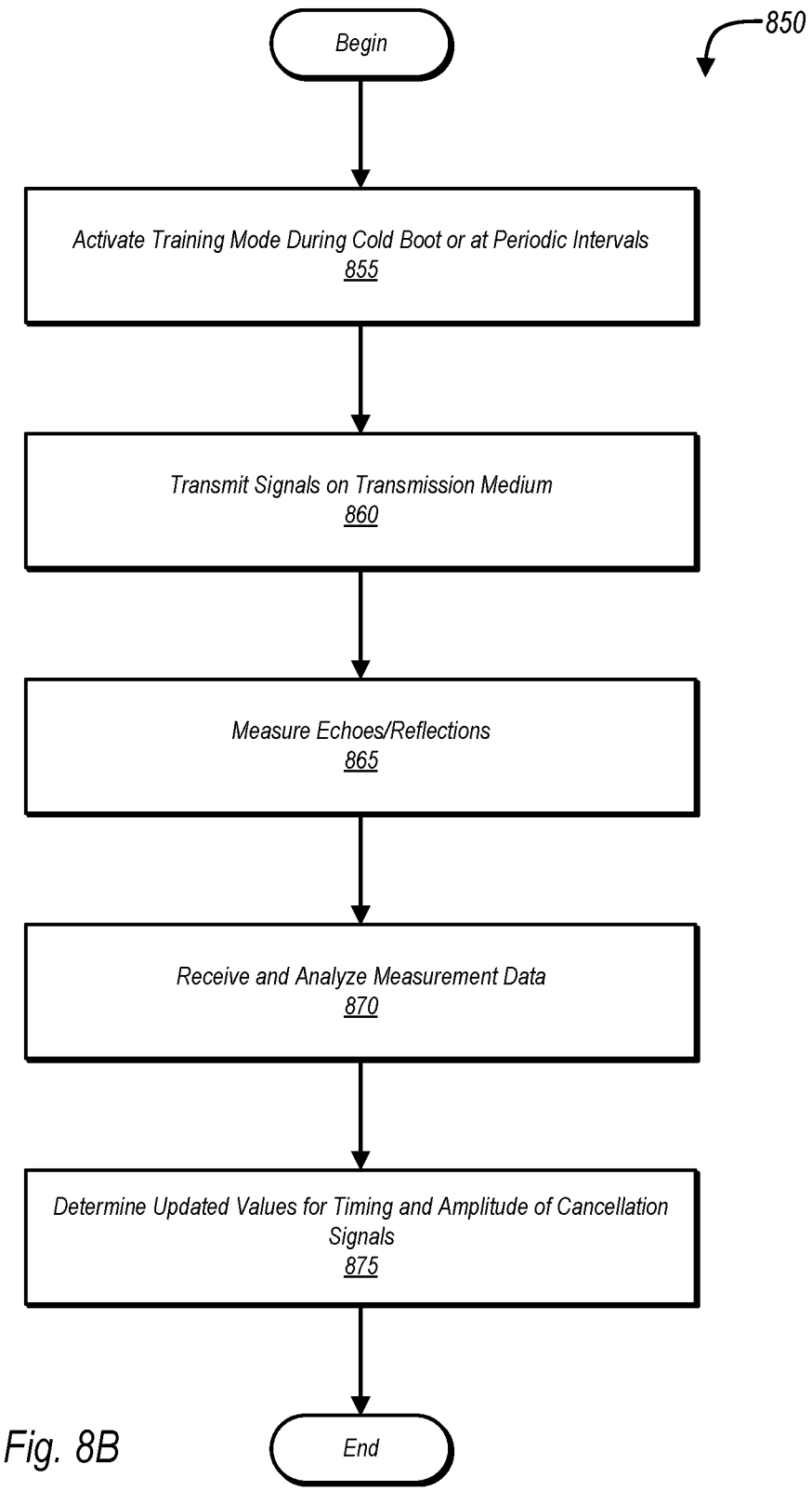
FIG. 8B is a flow diagram of an embodiment of a method for performing a training algorithm on a transmitter circuit.

FIG. 8B is a flow diagram of an embodiment of a method for performing a training algorithm on a transmitter circuit. Method 850 may be performed using any of the various embodiments of a transmitter circuit as disclosed herein. Other embodiments covered by this disclosure but otherwise not explicitly disclosed herein may also carry out Method 850.

Method 850 includes activating a training mode during a cold boot or at periodic intervals (block 855). The method also contemplates that an initial iteration of the training mode may be carried out during the cold boot procedure, with periodic or on-demand iterations being carried out thereafter as operating conditions (e.g., temperature) change.

Once in the training mode, the method includes transmitting signals on a transmission medium (block 860). The signals may carry data symbols, with a data symbol being defined herein as one or more bits. In response to the transmission of signals during the training mode, measurements of echoes and reflections may be carried out (block 865). Upon receiving the measurements, a control circuit may analyze the measurement data (block 870). Based on the measured data, the control circuit may determine updated values for timing and amplitude of cancellation signals (block 875). For example, the measured data may be used to determine a time and amplitude at which a reflection cancellation signal is to be transmitted, with the polarity being the opposite of the measured reflection.

Example System

Figure 9:
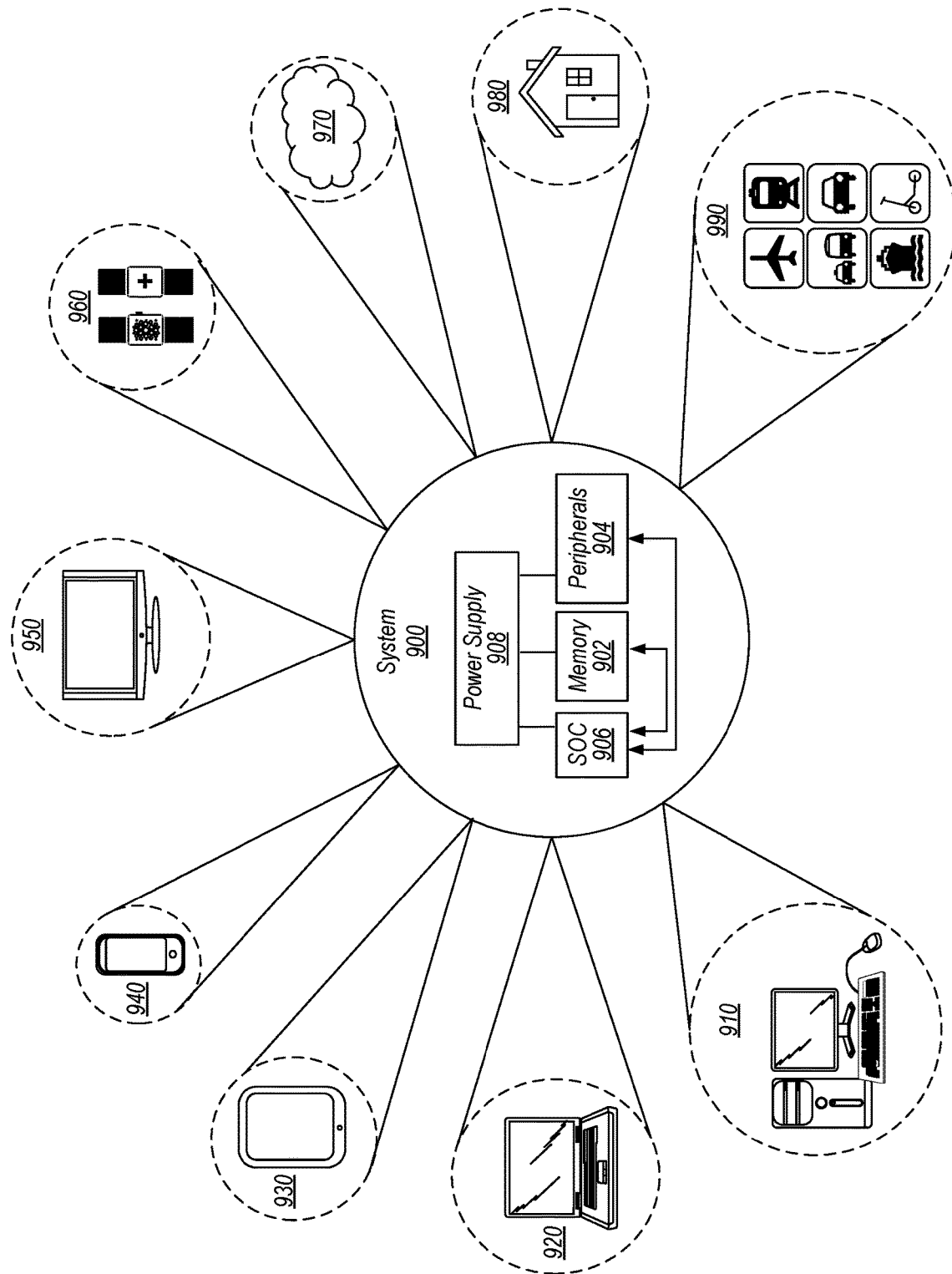
FIG. 9 is a block diagram of one embodiment of an example system.

Turning next to FIG. 9, a block diagram of one embodiment of a system 900 is shown that may incorporate and/or otherwise utilize the methods and mechanisms described herein. In the illustrated embodiment, the system 900 includes at least one instance of a system on a chip (SoC) 906 which may include multiple types of processing units, such as one or more CPU cores, a GPU having a number of graphic processing cores, a communications fabric, and interfaces to memories and input/output devices. In some embodiments, one or more processors in SoC 906 includes multiple execution lanes and an instruction issue queue. In various embodiments, SoC 906 is coupled to external memory 902, peripherals 904, and power supply 908. In some system embodiments, multiple instances of SoC 906 may be combined to form a common computing element.

In various embodiments, system 900 may include various communications links that implement an embodiment of the circuits and methods discussed above with respect to FIGS. 1-8B. For example, SoC 906 may include one or more memory controllers configured to communicate with one or more memories (such as memory 902). Each of the memory buses coupled between SoC 906 and a corresponding instance of memory 902 may include a plurality of communications links implemented in accordance with the present disclosure.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smartphone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, LPDDR3, LPDDR4, LPDDR5, LPDDR6, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 906 in the embodiment shown may be arranged in accordance with various other SoCs/ICs discussed above. That is, SoC 906 may implement a common functional architecture that can be used in each of the different system embodiments shown in FIG. 9. Thus, SoC 906 may also be arranged to disable certain functional circuit blocks therein in accordance with the particular system in which it is implemented. For example, a first set of functional circuit blocks may be disabled for an instance of SoC 906 that is implemented in a smartwatch 960, while a second set of functional circuit blocks may be disabled for another instance of SoC 906 implemented in desktop computer 910.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, smartwatch 960 may include a variety of general-purpose computing related functions. For example, smartwatch 960 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home system 980 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation. For example, system 900 may be used as a vehicular system 990 in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types.

Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a plurality of memory circuits coupled to a data bus that includes a plurality of wires; and
a memory controller coupled to the data bus, wherein the memory controller is configured to:
receive one or more signals that encode a plurality of symbols that include at least one bit;
generate a plurality of signals on corresponding ones of the plurality of wires using corresponding ones of the plurality of symbols;
in response to a determination that a particular time period has elapsed after a generation of the plurality of signals, generate a plurality of reflection cancellation signals on the corresponding ones of the plurality of wires using respective inverted values of different symbols received prior to the plurality of symbols, wherein respective composites of the plurality of signals and the plurality of reflection cancellation signals are readable at the plurality of memory circuits as respective values of the at least one bit included in a particular symbol.

2. The apparatus of claim 1, wherein the memory controller includes a plurality of data driver circuits configured to generate respective ones of the plurality of signals based on received ones of the plurality of symbols.

3. The apparatus of claim 2, wherein the memory controller includes a plurality of reflection cancellation circuits configured to generate respective ones of the plurality of reflection cancellation signals.

4. The apparatus of claim 3, further comprising a plurality of t-coil circuits, wherein ones of the plurality of t-coil circuits are coupled between a corresponding one of the plurality of data driver circuits and a corresponding one of the plurality of wires, wherein ones of the driver circuits are coupled to a corresponding one of the t-coil circuits via a variable capacitor.

5. The apparatus of claim 1, wherein the memory controller includes a plurality of echo cancellation circuits, wherein ones of the plurality of echo cancellation circuits are configured to, after generation of a corresponding one of the plurality of signals, generate a corresponding echo cancellation signal on a corresponding one of the plurality of wires.

6. The apparatus of claim 1, wherein the plurality of memory circuits comprise a dual rank memory including a first rank comprising a first subset of the plurality of memory circuits and a second rank comprising a second subset of the plurality of memory circuits, wherein memory circuits of the first and second ranks share the plurality of wires.

7. A method, comprising:
receiving, by a transmitter circuit, a plurality of signals that encode ones of a plurality of symbols;
generating, by the transmitter circuit, a first signal on a transmission medium using a first symbol of the plurality of symbols;

in response to determining that a first time period has elapsed since generating the first signal, generating, by the transmitter circuit, a second signal using a second symbol of the plurality of symbols that is received subsequent to the first symbol;

in response to determining that a second time period has elapse since generating the second signal, generating, by the transmitter circuit, a reflection cancellation signal on the transmission medium using an inverted value of the first symbol, wherein a composite of the second signal and the reflection cancellation signal is readable at a sample point.

8. The method of claim 7, further comprising generating, using an echo cancellation circuit, an echo cancellation signal on the transmission medium using the second symbol, wherein a composite of the first signal, the reflection cancellation signal, and the echo cancellation signal is readable at the sample point.

9. The method of claim 8, further comprising:
generating, by a driver circuit of the transmitter circuit, the first signal on the transmission medium via a t-coil circuit;
generating, by a reflection cancellation circuit of the transmitter circuit, the second signal;
conveying the second signal to the transmission medium via a tap point in the t-coil circuit; and
conveying, using the echo cancellation circuit, the echo cancellation signal via the tap point in the t-coil circuit.

10. The method of claim 9, further comprising conveying the second signal and the echo cancellation signal to the t-coil circuit via AC coupling.

11. The method of claim 7, further comprising activating, by a control circuit, a training mode, wherein activating the training mode comprises:
causing the transmitter circuit, using the control circuit, to generate test signals on the transmission medium;
receiving test measurement data, by the control circuit, based on the transmission of the test signals; and
determining an updated value of the first time period using the test measurement data.

12. The method of claim 11, further comprising activating the training mode during a cold boot procedure.

13. An apparatus, comprising:
a control circuit configured to receive a plurality of input signals that include a plurality of symbols having at least one bit;
a data driver circuit configured to generate a particular signal on a transmission medium using a particular symbol of the plurality of symbols; and
a reflection cancellation circuit configured to, after a generation of the particular signal, generate a reflection cancellation signal on the transmission medium using an inverted value of a different symbol of the plurality of symbols received prior to the particular symbol, wherein a first composite of the particular signal and the reflection cancellation signal is readable at a load as a value of the particular symbol, wherein the load is configured to receive the particular signal via the transmission medium.

14. The apparatus of claim 13, further comprising an echo cancellation circuit configured to, after the generation of the particular signal, generate an echo cancellation signal on the transmission medium using the particular symbol, wherein a second composite of the particular signal, the reflection cancellation signal, and the echo cancellation signal is readable at the load.

15. The apparatus of claim 14, wherein the data driver circuit is coupled to the transmission medium via a t-coil circuit, wherein the reflection cancellation circuit is coupled to a tap point of the t-coil circuit via at least a first variable capacitor, and wherein the echo cancellation circuit is coupled to the tap point of the t-coil circuit via at least a second variable capacitor.

16. The apparatus of claim 13, wherein the control circuit is configured to activate a training mode, and further configured to, in response to an activation of the training mode, to:
generate test signals on the transmission medium;
receive test measurement data based on the transmission of the test signals; and
determine a time period between the generation of the particular signal and the reflection cancellation signal using the test measurement data.

17. The apparatus of claim 16, wherein the control circuit is configured to activate the training mode during a cold boot procedure.

18. The apparatus of claim 16, wherein the control circuit is configured to, during operation in the training mode, adjust a value of a capacitor coupled between the reflection cancellation circuit and the transmission medium.

19. The apparatus of claim 13, further comprising an equalization circuit configured to generate an equalization signal on the transmission medium based on the particular symbol and concurrent with generation of the particular signal.

20. The apparatus of claim 13, wherein the transmission medium is coupled between a memory controller and a dual-rank memory system having a first memory bank and a second memory bank.

\* \* \* \* \*